United States Patent
Matsumoto et al.

(10) Patent No.: US 7,593,037 B2
(45) Date of Patent: Sep. 22, 2009

(54) IMAGING DEVICE AND METHOD FOR CAPTURING IMAGE

(75) Inventors: Nobuyuki Matsumoto, Tokyo (JP); Takashi Ida, Kanagawa (JP); Takeshi Mita, Kanagawa (JP); Hidenori Takeshima, Kanagawa (JP); Yasunori Taguchi, Kanagawa (JP); Kenzo Isogawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 513 days.

(21) Appl. No.: 11/461,662

(22) Filed: Aug. 1, 2006

(65) Prior Publication Data

US 2007/0046785 A1  Mar. 1, 2007

(30) Foreign Application Priority Data

Aug. 31, 2005  (JP) .............................. 2005-252268

(51) Int. Cl.
| | |
|---|---|
| H04N 5/228 | (2006.01) |
| H04N 7/18 | (2006.01) |
| H04N 7/01 | (2006.01) |
| H04N 11/20 | (2006.01) |
| G06K 9/00 | (2006.01) |
| G06K 9/40 | (2006.01) |
| G06K 9/32 | (2006.01) |
| G06K 9/36 | (2006.01) |
| G09G 5/397 | (2006.01) |

(52) U.S. Cl. .............................. 348/208.13; 348/208.4; 348/154; 348/441; 348/452; 348/220.1; 382/107; 382/254; 382/299; 382/236; 382/154; 345/546

(58) Field of Classification Search .............. 348/222.1, 348/208.4, 220.1, 441, 451, 452, 447, 459, 348/622, 623, 14.1, 15.4, 155, 208.13, 352, 348/402.1, 449; 345/546; 382/107, 154, 382/236, 299, 254

See application file for complete search history.

(56) References Cited

U.S. PATENT DOCUMENTS 5,355,169 A * 10/1994 Richards et al. ............. 348/459

(Continued)

FOREIGN PATENT DOCUMENTS

| JP | 2005-57378 | 3/2005 |
|---|---|---|
| JP | 2005-197910 | 7/2005 |

OTHER PUBLICATIONS

U.S. Appl. No. 12/048,925, filed Mar. 14, 2008, Matsumoto, et al.

(Continued)

*Primary Examiner*—Lin Ye
*Assistant Examiner*—Marly Camargo
(74) *Attorney, Agent, or Firm*—Oblon, Spivak, McClelland, Maier & Neustadt, L.L.P.

(57) ABSTRACT

An imaging device includes: a capturing unit that captures a motion picture at one of a plurality of frame rates; a buffer that temporary stores the motion picture captured by the capturing unit; a signal generation unit that generates a signal used for specifying a core frame that is to be subjected to a resolution enhancement processing, while the capturing unit captures the motion picture at a first frame rate; a capturing control unit that controls the capturing unit to capture the motion picture, after the core frame specified by the signal, at a second frame rate that is higher than the first frame rate; a reference frame determination unit that determines a frame stored in the buffering unit at the second frame rate as a reference frame; and an image processing unit that performs the resolution enhancement processing by converting the core frame into a high-resolution frame by reference to the reference frame determined by the reference frame determination unit.

16 Claims, 11 Drawing Sheets

U.S. PATENT DOCUMENTS

| | | | |
|---|---|---|---|
| 6,804,419 | B1 | 10/2004 | Miyake |
| 2004/0218828 | A1 | 11/2004 | Aiso |
| 2005/0030316 | A1* | 2/2005 | Sirtori et al. ................. 345/546 |
| 2005/0219642 | A1* | 10/2005 | Yachida et al. ............... 358/448 |
| 2006/0147187 | A1* | 7/2006 | Takemoto et al. ............ 386/117 |
| 2009/0116732 | A1* | 5/2009 | Zhou et al. ................... 382/154 |

OTHER PUBLICATIONS

U.S. Appl. No. 12/233,030, filed Sep. 18, 2008, Takeshima, et al.

U.S. Appl. No. 11/695,820, filed Apr. 3, 2007, Taguchi, et al.

U.S. Appl. No. 11/311,483, filed Dec. 20, 2005, Nobuyuki Matsumoto, et al.

U.S. Appl. No. 11/828,397, filed Jul. 26, 2007, Matsumoto, et al.

U.S. Appl. No. 11/677,719, filed Feb. 22, 2007, Taguchi, et al.

U.S. Appl. No. 11/558,219, filed Nov. 9, 2006, Ida, et al.

* cited by examiner

IMAGING DEVICE AND METHOD FOR CAPTURING IMAGE

RELATED APPLICATION

The present disclosure relates to the subject matter contained in Japanese Patent Application No. 2005-252268 filed on Aug. 31, 2005, which is incorporated herein by reference in its entirety.

FIELD

The present invention relates to an imaging device capable of taking both a motion picture and a high-quality still image.

BACKGROUND

An imaging device capable of capturing a motion picture of an existing television size and a high-quality still image has recently been proposed.

However, as described in JP-A-2005-057378, a related-art imaging device has two systems, each of which consists of capturing unit and buffering unit used for concurrently capturing a motion picture and a still picture. However, this method encounters a problem of an increase in a circuitry scale and a cost hike.

In order to solve this problem, JP-A-2005-197910 describes an imaging device that, during capture of a motion picture, records a frame number assigned to the motion picture—which is now in the course of being captured—when a shutter button is pressed to photograph a still image. High resolution operation is performed by means of: taking a frame designated by the frame number as a core frame to be imparted with high resolution; and taking frames straddling the core frame as reference frames used for the high resolution operation. The imaging device enables photographing of a high-resolution still image of a desired moment without involvement of a substantial increase in the amount of processing performed during capture of a motion picture and in circuitry scale.

However, according to the above described method, the reference frames, which straddle the core frame, are not optimal, which in turn poses a limitation in operation for imparting high resolution to the still image.

As mentioned above, the related art involves a necessity for two systems, each of which consists of capturing unit and buffering unit used for concurrently capturing a motion picture and a still picture, and encounters a problem of a failure to reduce a circuitry scale. Moreover, a frame number assigned to a motion picture—which has been captured at the moment of the shutter button being pressed to capture a still image—is recorded. Subsequently, high resolution operation is performed by means of: taking the frame designated by the frame number as a core frame to be imparted with high resolution; and taking frames straddling the core frame as reference frames used for the high resolution operation. According to this method, restraints are imposed on the reference frames straddling the core frame, and limitations are encountered in imparting high resolution to the core frame.

SUMMARY OF THE INVENTION

According to a first aspect of the invention, there is provided an imaging device including: a capturing unit that captures a motion picture at one of a plurality of frame rates; a buffer that temporary stores the motion picture captured by the capturing unit; a signal generation unit that generates a signal used for specifying a core frame that is to be subjected to a resolution enhancement processing, while the capturing unit captures the motion picture at a first frame rate; a capturing control unit that controls the capturing unit to capture the motion picture, after the core frame specified by the signal, at a second frame rate that is higher than the first frame rate; a reference frame determination unit that determines a frame stored in the buffer at the second frame rate as a reference frame; and an image processing unit that performs the resolution enhancement processing by converting the core frame into a high-resolution frame by reference to the reference frame determined by the reference frame determination unit.

According to a second aspect of the invention, there is provided a method for capturing image, including: capturing a motion picture at one of a plurality of frame rates; temporary storing the captured motion picture; generating a signal used for specifying a core frame that is to be subjected to a resolution enhancement processing, while capturing the motion picture at a first frame rate; controlling the capturing of the motion picture to capture frames, after the core frame specified by the signal, at a second frame rate that is higher than the first frame rate; determining a frame temporary stored at the second frame rate as a reference frame; and performing the resolution enhancement processing by converting the core frame into a high-resolution frame by reference to the reference frame.

DETAILED DESCRIPTION OF THE PREFERRED EMBODIMENTS

Referring now to the accompanying drawings, a description will be given in detail of embodiments of the invention.

First Embodiment

Figure 1:
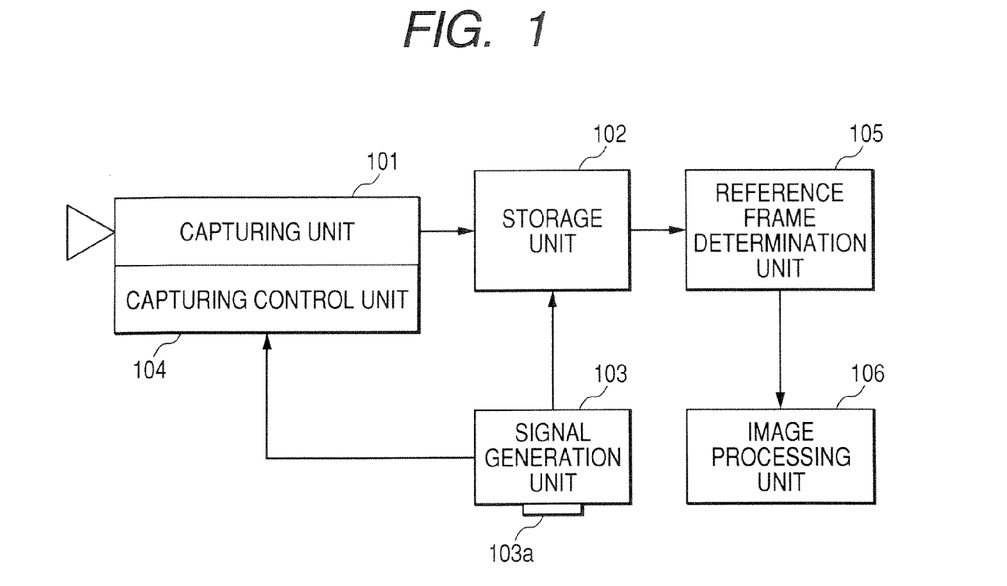
FIG. 1 is a block diagram showing a configuration of an imaging device according to a first embodiment.

FIG. 1 is a block diagram showing an imaging device according to a first embodiment.

The imaging device of the first embodiment includes a capturing unit 101 that captures a motion picture at a plurality of frame rates; a storage unit 102 that stores the captured motion picture; a signal generation unit 103 that generates a signal used for specifying a core frame, which is to be imparted with high resolution, in the motion picture; a capturing control unit 104 that switches the frame rate for capturing the capturing unit 101 in accordance with the signal input from the signal generation unit 103; a reference frame determination unit 105 that determines reference frames used for imparting the core frame with high resolution; and a image processing unit 106 that converts the core frame into a high-resolution image through use of the reference frames.

The capturing unit 101 captures a motion picture by means of an imaging device such as a CCD (Charge-Coupled Device) element. For instance, the capturing unit captures, at a frame rate of 30 fps in time series, a still image of VGA size (640×480 pixels) into which the NTSC size of an existing television set is digitized.

The storage unit 102 stores, in chronological order, the images captured by the capturing unit 101 for capturing a motion picture. The motion picture is stored in a storage medium such as SD memory; an HDD (Hard Disk Drive); a DVD; a tape medium; or the like. The motion picture is usually stored in a data format into which a motion picture is compressed, such as MPEG-2 or MPEG-4.

The signal generation unit 103 generates a signal used for specifying a core frame, which is to be imparted with high resolution, in the motion picture. For instance, during the capture of a motion picture, the user generates, as a signal used for specifying a core frame, a frame number assigned to a motion picture captured at the moment of the shutter button 103a being pressed for acquiring a still image.

The reference frame determination unit 105 determines reference frames, which are used in operation for imparting high resolution to the core frame in the motion picture, from the time-series images stored in the storage unit 102 by means of the signal generated by the signal generation unit 103.

The image processing unit 106 converts the core frame, for which the signal generation unit 103 has generated a signal used for specification, into a high-resolution image through use of the reference frames determined by the reference frame determination unit 105.

Figure 2:
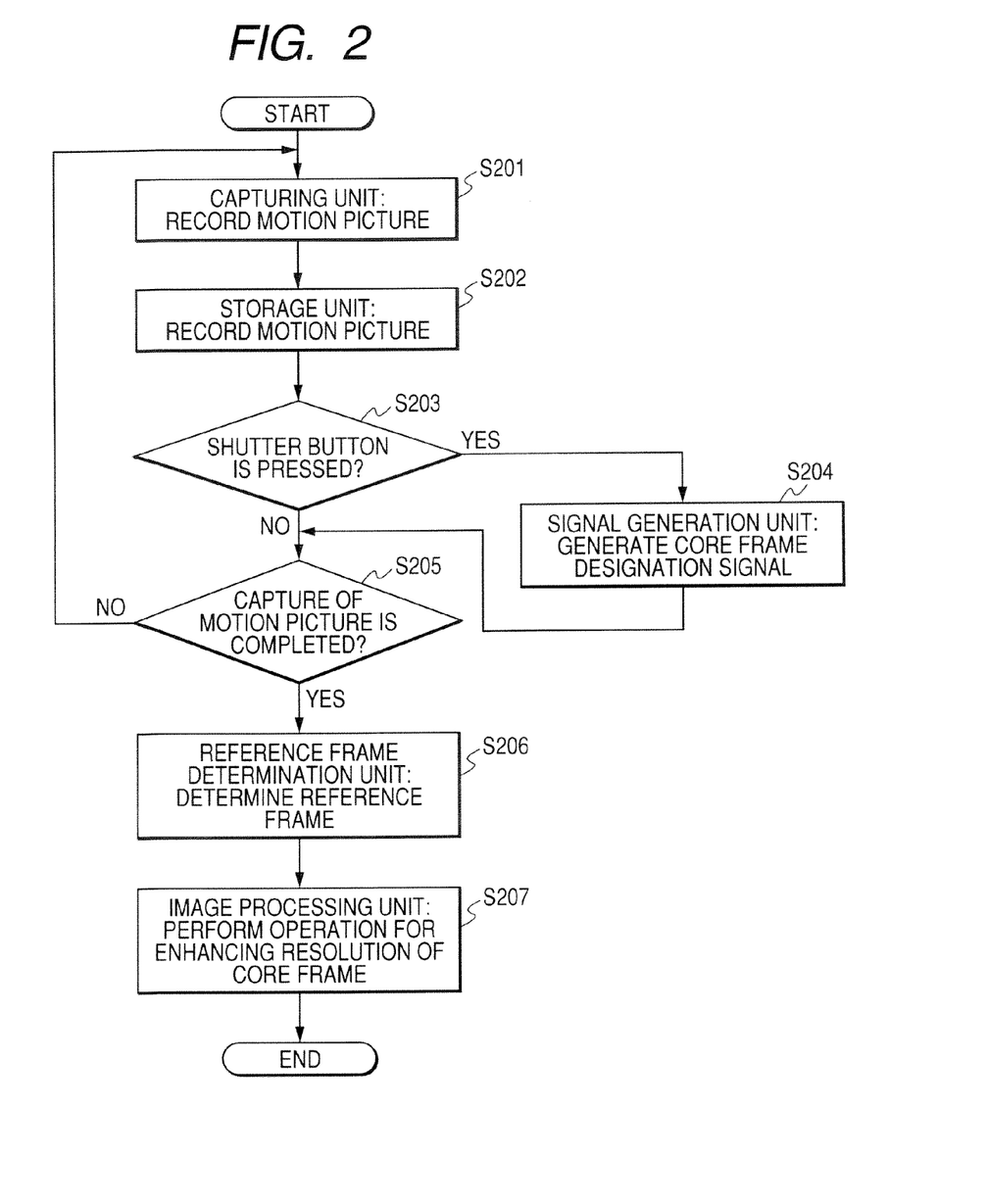
FIG. 2 is a flowchart showing operation of the imaging device according to the first embodiment.

Operation of the imaging device according to the first embodiment will now be described by reference to FIGS. 1 and 2. FIG. 2 is a flowchart showing operation of the imaging device according to the first embodiment.

The capturing unit 101 starts capturing a motion picture at a first frame rate (step S201).

The storage unit 102 stores the captured motion picture (step S202).

Next, the signal generating unit 103 determines whether or not the shutter button 103a is pressed (step S203). When the shutter button 103a is pressed (YES in step S203), the signal generation unit 103 records a frame number assigned to a motion picture, which is captured at the moment of the shutter button 103a being pressed to acquire a still image, as a signal used for specifying a core frame which is to be imparted with high resolution in a motion picture (step S204). The capturing unit 101 returns to the first frame rate from when capturing is commenced at a second frame rate—higher than the first frame rate—until a required number of frames is achieved. Processing proceeds to the next processing (step S205). When the shutter button 103a is not pressed (NO in step S203), a signal is not generated, and processing proceeds to the next process (step S205).

The capturing unit 101 determines whether or not taking of a motion picture is terminated (step S205). When taking of a motion picture is not terminated (NO in step S205), the capturing unit 101 captures the next image (step S201). The storage unit 102 records the captured image (step S202). For instance, a determination as to whether or not taking of a motion picture is terminated may be made on the basis of whether or not the user has issued an instruction for terminating capturing action or whether or not a given period has elapsed since initiation of taking of the motion picture.

When taking of a motion picture has been completed (YES in step S205), the reference frame determination unit 105 determines from the storage unit 102 reference frames used for imparting the core frame with high resolution, on the basis of the signal generated by the signal generation unit 103 for specifying the core frame; namely, a frame number assigned to the motion picture captured at the moment of the shutter button 103a being pressed to capture a still image (step S206). As to the reference frames, the frames—which have been recorded after the core frame and stored at the second frame rate higher than the first frame rate—are selected as reference frames. Alternatively, one frame taken before the core frame and two frames subsequent to the core frame may be selected; or a larger number of reference frames may be selected as the scaling factor used for imparting high resolution to the core frame is increased. For instance, when the scaling factor used for rendering the resolution of the core frame high is two in both the vertical and horizontal directions, four frames, including the core frame, may be selected. When the scaling factor used for rendering the resolution of the core frame high is three in both the vertical and horizontal directions, nine frames, including the core frame, may be selected.

Figure 9:
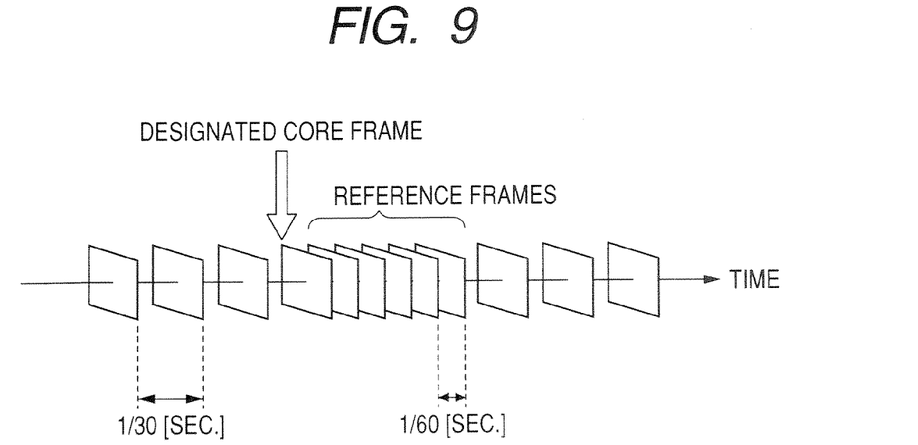
FIG. 9 is a view showing that a motion picture is taken for a given period of time after capture of a core frame at a frame rate which is higher than that employed in a time other than the predetermined time.

FIG. 9 shows an example where the first frame rate is 1/30 second and the second frame rate is 1/60 second. After the thus-designated core frame, a motion picture is shot at a frame rate, which is higher than the preceding frame rate, within a given period of time. Thus, when the resolution of the core frame is made higher, the scaling factor can be increased.

The image processing unit 106 converts the core frame, for which the signal generation unit 103 has generated a signal, into a high-resolution image by use of the reference frames determined by the reference frame determination unit 105 (step S207), and image processing is completed. A method for enhancing resolution is to detect motions between the core frame and the reference frames; and to perform high-resolution operation by reference to the reference frames that have undergone motion compensation on the basis of the motions. A high resolution operation technique based on MAP (Maximization of a posterior probability sequence estimation) method, which is classified into Reconstruction super-resolution processing, will be described hereinbelow. The MAP method is to determine a high-resolution image (hereinafter called an "estimated high-resolution image") which maximizes a posterior probability while a core frame and reference frames (hereinafter called "observed low-resolution images") among captured and stored motion picture frames are taken as conditions. The posterior probability is formulated as a cost function, and an optimization problem is resolved by use of the steepest-descent method, the conjugate gradient method, genetic algorithms, or the like, to thus minimize the cost function and estimate a high-resolution image. The cost function for the minimization problem can be computed according to Equation (1).

$$E(x) = \sum_{k=1}^{K} \|y_k - W_k x\|^2 + \alpha \|Cx\|^2 \quad (1)$$

In the Equation (1), "x" denotes a vector representation of an estimated high-resolution image; "$y_k$" denotes a vector representation of the k-th observed low-resolution image; "$W_k$" denotes a matrix representing conversion of an estimated high-resolution image into the k-th observed image (information about motions between a core frame and reference frames, a point spread function of the capturing unit 101, down-sampling, or the like); "K" denotes the number of observed images; "C" denotes a matrix (generally embodied as a high-pass filter) representing anterior information; "α" denotes a parameter representing the strength of restraint; and "∥ ∥" represents L2 norm. An estimated high-resolution image "x" is computed by means of solving the problem of minimizing the formulated cost function. The method for rendering the resolution of an image high is not limited to the MAP method. All commonly-available methods can be adopted; for instance, the non-uniform interpolation method, the POCS (Projection Onto Convex Sets) method, the back projection method, and the like.

As mentioned above, according to the imaging device of the first embodiment, a frame number assigned to a motion picture, which is captured at the moment of a shutter button 103a being pressed for capturing a still image, is recorded during capture of a motion picture. Subsequently, the frame designated by the frame number is taken as a core frame to be imparted with high resolution, and frames which have been captured at a higher frame rate are taken as reference frames used for high resolution operation. Thus, high resolution operation is performed. As a result, a high-resolution still image of desired moment can be captured without involvement of a substantial increase in the amount of processing performed during capturing of a motion picture and an increase in circuitry scale.

Second Embodiment

An imaging device according to a second embodiment will now be described. This imaging device observes a larger volume of information used for rendering the resolution of the core frame high by use of excessive processing capability of the imaging device, to thus render the resolution of the core frame higher.

Figure 3:
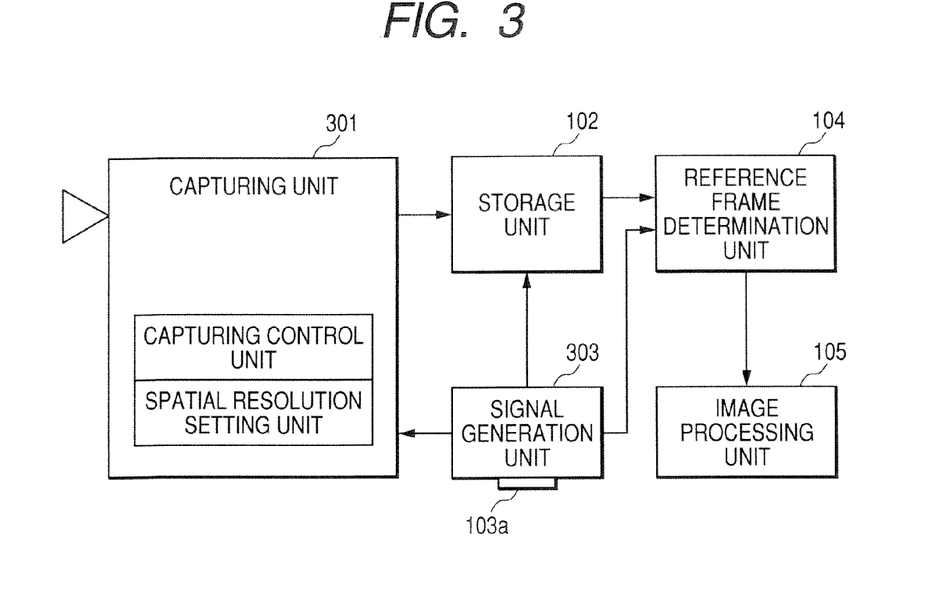
FIG. 3 is a block diagram showing a configuration of an imaging device according to a second embodiment.

FIG. 3 is a block diagram showing the imaging device according to the second embodiment.

As shown in FIG. 3, this imaging device differs from its counterpart of the first embodiment in terms of the function of a capturing unit 301 and that of a signal generation unit 303 having been changed. In connection with other configurations and functions, FIG. 3 is identical with FIG. 1, which is a block diagram showing the configuration of the first embodiment, and hence the same reference numerals are assigned to corresponding elements in FIG. 3, and their explanations are omitted here.

The capturing unit 301 has a first capturing mode and a second capturing mode, and captures a motion picture while switching between the modes.

The signal generation unit 303 generates a signal used for specifying a core frame, which is a frame to be subjected to high-resolution operation in the motion picture, and a signal used for effecting switching between the capturing modes of the capturing unit 301.

Figure 4:
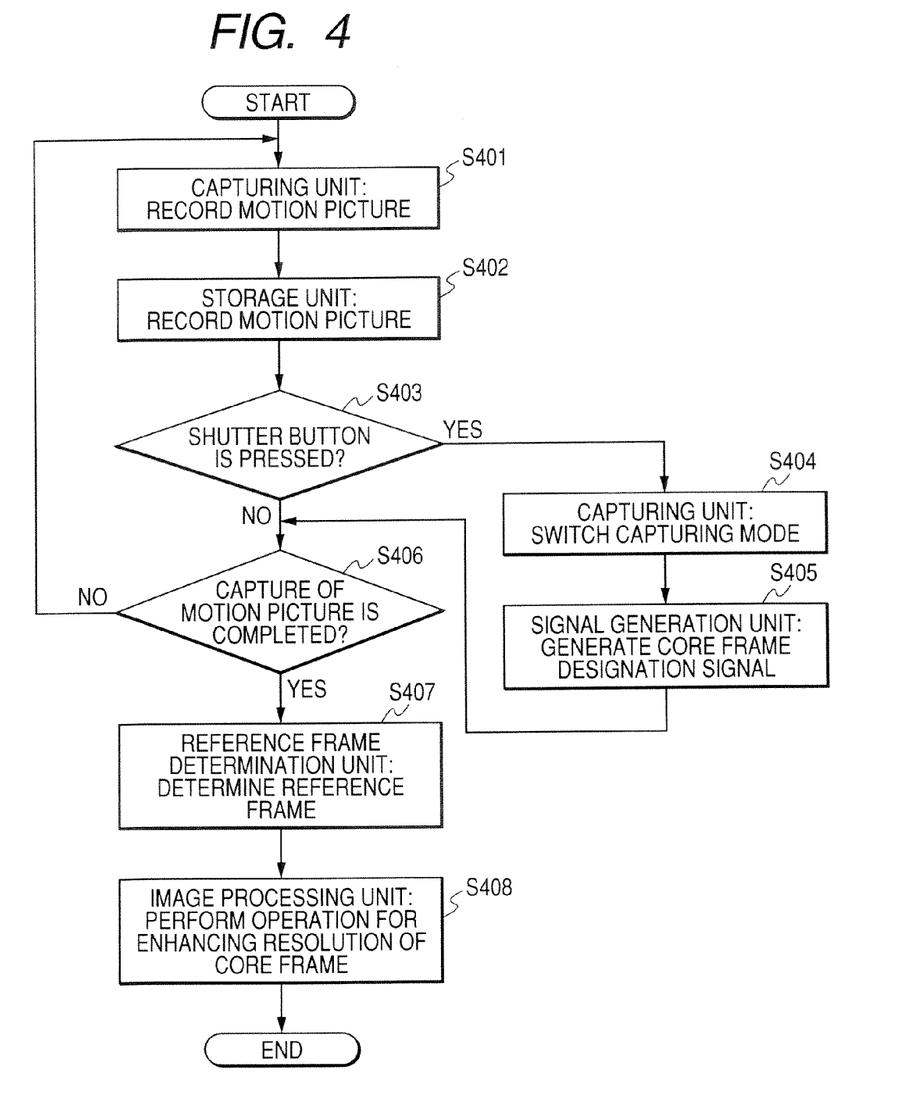
FIG. 4 is a flowchart showing operation of the imaging device according to the second embodiment.

Operation for effecting switching between the modes of the imaging device of the second embodiment having the above configuration will now be described by reference to FIGS. 3 and 4. FIG. 4 is a flowchart showing operation of the imaging device of the second embodiment.

The capturing unit 301 starts capturing a motion picture in the first capturing mode (step S401). The first capturing mode is a mode for taking in time sequence a still image of VGA size (640☐480 pixels), to which the NTSC size of the existing television is digitized, at a frame rate of 30 fps; namely, a common mode for capturing a motion picture.

Next, the storage unit 102 stores the captured motion picture as in the case of step S202 (step S402).

The signal generation unit 303 determines whether or not the shutter button 103a is pressed (step S403). When the shutter button 103a is pressed (Yes in step S403), the signal generation unit 303 switches the capturing mode of the capturing unit 301 to the second capturing mode (step S404); records, as a signal used for specifying a core frame whose resolution is to be enhanced in a motion picture, the frame number assigned to the motion picture captured at the moment of the shutter button 103a being pressed to capture a still image (step S405); and proceeds to the next process (step S406). When the shutter button 103a is not pressed (No in step S403), no signal is generated, and processing proceeds to the next process (step S406). The second capturing mode is a mode for taking an image in the core frame and/or the reference frames at spatial resolution which is higher than the VGA size (640×480 pixels), which is a resolution for another frame. As a result of the capturing mode being switched to the second capturing mode, a larger volume of information used for rendering the resolution of the core frame higher can be observed by use of excessive processing capability of the imaging device.

Figure 10:
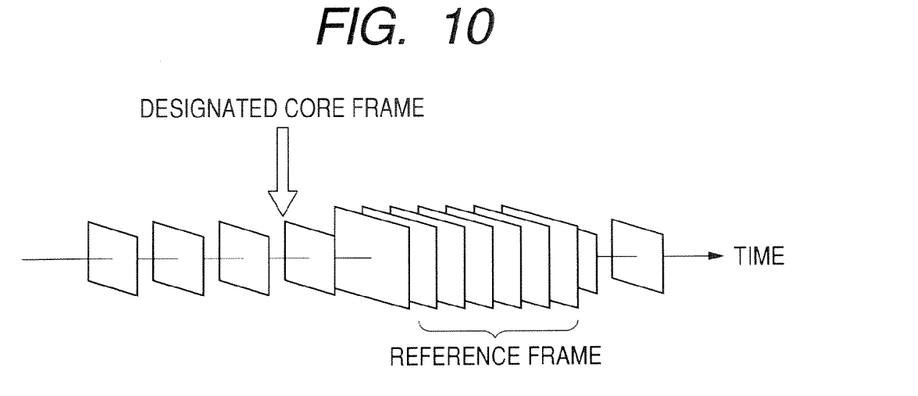
FIG. 10 is a view showing that a motion picture is taken for a given period of time after capture of a core frame at a frame rate and spatial resolution which are higher than those employed in a time other than the predetermined time.

FIG. 10 shows an example first frame rate of 1/30 seconds and an example second frame rate of 1/60 seconds. The core frame and the reference frames are arranged to take motion pictures of spatial resolution which is higher than that used for other frames. During a predetermined period of time after the thus-designated core frame, a motion picture of higher spatial resolution is taken at a frame rate which is higher than that used before the core frame. Thus, a scaling factor can be increased when the resolution of the core frame is enhanced.

Motion picture capturing completion determination processing pertaining to step S406, reference frame determination processing pertaining to step S407, and core frame high resolution operation processing pertaining to step S408 are analogous to processing pertaining to steps S205 to S207, which pertain to the imaging device of the first embodiment, and their explanations are omitted.

As mentioned above, according to the imaging device of the second embodiment, during a given period of the core frame a motion picture is taken at a higher frame rate and at higher spatial resolution than those employed at times other than the period of the core frame, by use of excessive processing capability of the imaging device. As a result, the resolution of the core frame can be further enhanced.

Third Embodiment

An imaging device having a capturing unit, such as a video camera or the like, is usually equipped with a hand shake compensation function. Initially, the hand shake correction function detects the amounts of hand shakes by means of a method called an image detection method and a method called an angular velocity detection method. Next, hand shakes are corrected on the basis of the amounts of hand shakes by means of an electronic hand shake correction method for compensating for movements in an image by means of image processing or an optical hand shake correction method for taking an image by means of shifting an optical system. However, in relation to the camera equipped with such a hand shake correction function, when high-resolution operation processing is performed after capture of a motion picture, the amounts of hand shakes are detected, and the thus-detected amounts of hand shakes are stored. If a motion picture is stored without involvement of operation for compensating movements of the image by means of the electronic hand shake correction method or the optical hand shake correction method, a larger volume of information which can be utilized for enhancing resolution can be obtained.

The imaging device of the third embodiment stores the amounts of hand shakes detected by the video detection method or the angular velocity detection method; and stores a motion picture without performing motion compensation based on the electronic hand shake correction method or the optical hand shake correction method, to thus enable enhance the resolution of the core frame with higher accuracy.

Figure 5:
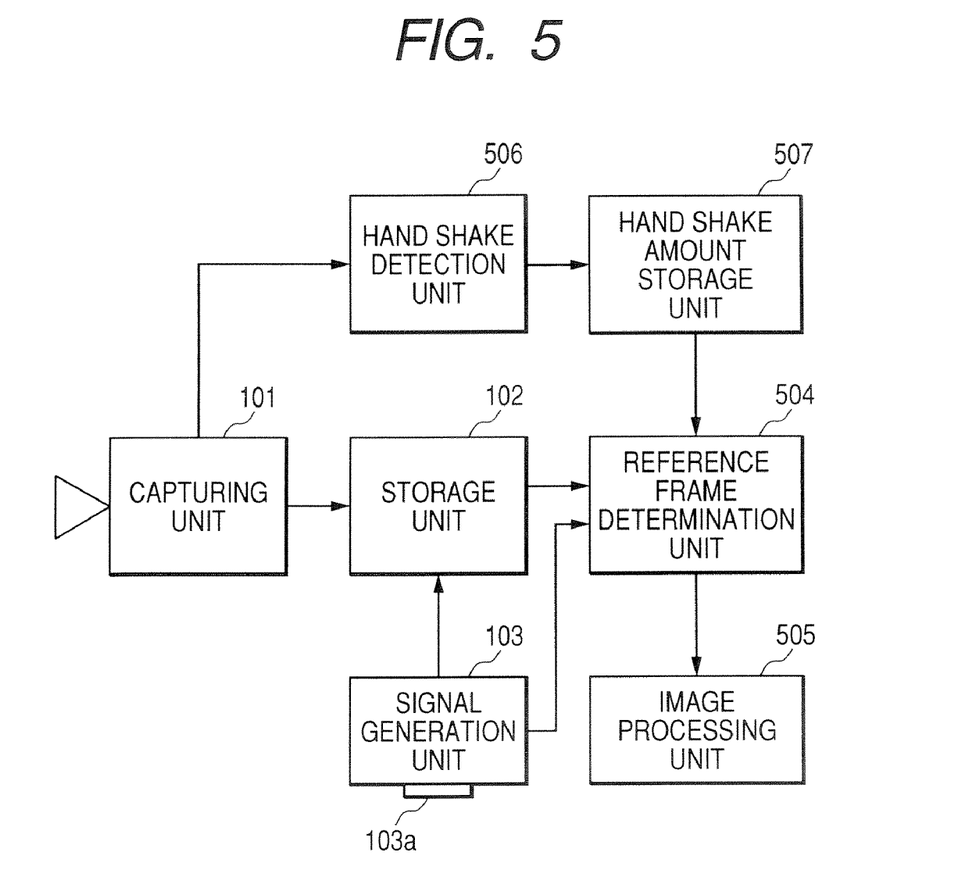
FIG. 5 is a block diagram showing a configuration of an imaging device according to a third embodiment.

FIG. 5 is a block diagram showing an imaging device according to a third embodiment.

As shown in FIG. 5, the imaging device differs from its counterpart of the first embodiment in that a hand shake detection unit 506 and a hand shake amount storage unit 507 are added to the imaging device of the first embodiment; and in that the function of a reference frame determination unit 504 and that of a image processing unit 505 are changed from those of their counterparts. In connection with other configurations and functions, FIG. 5 is identical with FIG. 1, which is a block diagram showing the configuration of the first embodiment, and hence the same reference numerals are assigned to corresponding elements in FIG. 5, and their explanations are omitted here.

The hand shake detection unit 506 detects the extent to which the imaging device has become displaced from a reference position due to the hand shakes.

The hand shake amount storage unit 507 stores the amounts of hand shakes detected by the hand shake detection unit 506.

The reference frame determination unit 504 determines, from time-series images stored in the storage unit 102, reference frames used for increasing the resolution of the core frame whose resolution is to be enhanced in the motion picture, by use of the signal generated by the signal generation unit 103 and the amounts of hand shakes stored in the hand shake amount storage unit 507.

The image processing unit 505 converts the core frame, for which the signal generation unit 103 has generated a designation signal, into a high-resolution image, through use of the reference frames determined by the reference frame determination unit 105 and the amounts of hand shakes stored in the hand shake amount storage unit 507.

Figure 6:
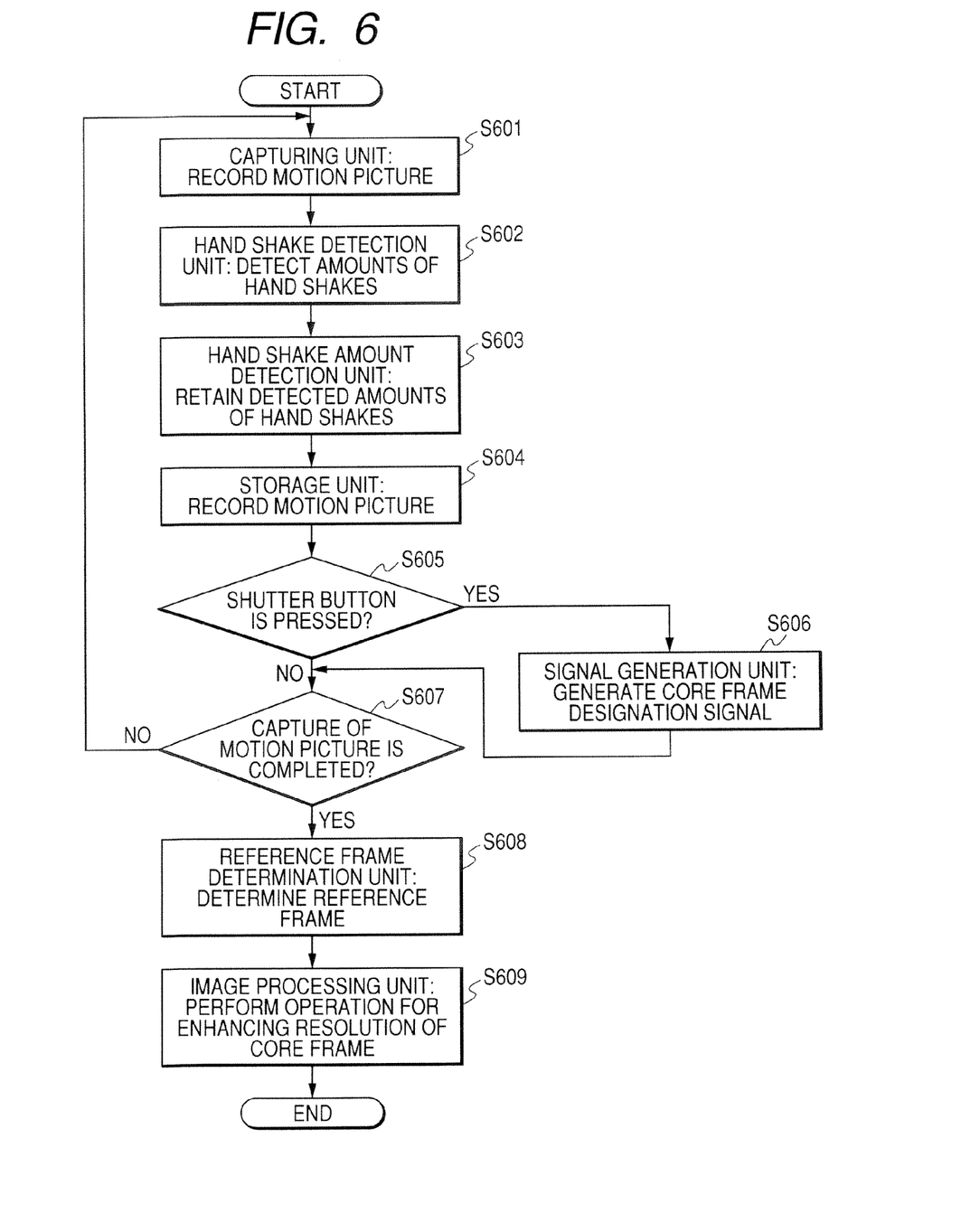
FIG. 6 is a flowchart showing operation of the imaging device according to the third embodiment.

The high-resolution operation using the amounts of hand shakes will now be described by reference to FIGS. 5 and 6. FIG. 6 is a flowchart showing operation of the imaging device of the third embodiment.

First, the capturing unit 101 starts capturing a motion picture at the first frame rate (step S601).

The hand shake detection unit 506 detects the amount of displacement from the reference position for the image captured by the capturing unit 101 as amounts of hand shakes (step S602). In relation to the amounts of hand shakes, the amount of displacement, where correlation values between the current frame and the reference frame are maximized, is computed as the quantity of hand shakes according to the video detection method. Alternatively, according to the angular velocity detection method, movements of the imaging device attributable to hand shakes are detected by two angular velocity sensors for vertical and horizontal directions, which are called gyroscopes.

The hand shake amount storage unit 507 stores the amounts of hand shakes detected by the hand shake detection unit 506 (step S603).

Storage processing pertaining to step S604, shutter button 103a determination processing pertaining to step S605, core frame signal generation processing pertaining to step S606, and motion picture capturing completion determination processing pertaining to step S607 are analogous to processing of the imaging device of the first embodiment pertaining to steps S202 to S205, and hence their explanations are omitted.

On the basis of the signal which has originated from the signal generation unit 103 and is used for specifying the core frame and the amounts of hand shakes stored in the hand shake amount storage unit 507, the reference frame determination unit 504 determines from the storage unit 102 the reference frames used for enhancing the resolution of the core frame (step S608).

In general, the amounts of hand shakes between the core frame and the reference frame preferably correspond to one-half a pixel; namely, assume a phase difference of one-half. By means of reference frame determination processing, a frame whose phase difference is close to one-half is selected as a reference frame. However, if a time lag between the core frame and the reference frame becomes greater, the frame assuming a phase difference of one-half will become inappropriate as a reference frame to be used for enhancing resolution, depending on the motion of the subject. Therefore, it is also preferable to select, as a reference frame, a frame whose phase difference is close to one-half within a given period of the core frame.

The image processing unit 505 then converts the core frame into a high-resolution image by use of the reference frame determined by the reference frame determination unit 504 and the amounts of hand shakes stored in the hand shake amount storage unit 507 (step S609), and completes image processing. During high-resolution operation processing, the accuracy of the high-resolution image is greatly dependent on the accuracy of a matrix $W_k$, which represents conversion of the estimated high-resolution image into the k-th observed image, as indicated by Equation (1). The matrix $W_k$ is estimated by use of the amounts of hand shakes, which are detected by the hand shake detection unit 506 and recorded in the hand shake amount storage unit 507, whereby the estimation accuracy of the matrix $W_k$ is increased, and the image quality of the high-resolution image is enhanced, as well.

The hand shake detection unit 506 does not detect hand shakes, and the hand shake amount storage unit 507 does not retain the amounts of hand shakes. In short, when high-resolution operation processing is performed after capture of a motion picture in the camera equipped with the hand shake correction function, an image—where a phase difference required for resolution enhancement has arisen—can be observed by means of merely deactivating the hand shake correction function and storing the image having undergone a phase difference in the storage unit 102, and higher image quality is achieved.

As mentioned above, according to the imaging device of the third embodiment, there are stored the amounts of hand shakes which have been detected according to the video detection method or the angular velocity detection method, and the motion picture is stored without involvement of motion compensation based on the electronic hand shake correction method or the optical hand shake correction method. Thus, the resolution of the core frame can be further enhanced.

Fourth Embodiment

An imaging device according to a fourth embodiment captures information, which is effective for performing resolution enhancing operation prior to the core frame, as a result of the signal generation unit generating a signal when pressing of the shutter button has been started and when the shutter button has been fully pressed (pushed). Subsequently, in the fourth embodiment, a motion picture is described as a time-series image in order to describe operation for enhancing the resolution of the core frame during capture of a motion image and operation for enhancing the resolution of a plurality of still images with use of a still camera.

Figure 7:
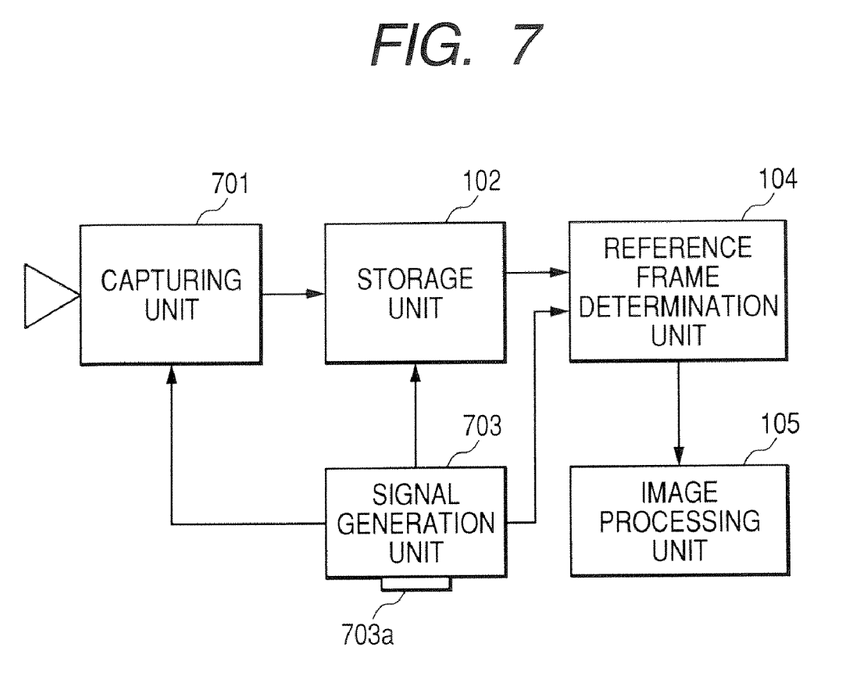
FIG. 7 is a block diagram showing a configuration of an imaging device according to a fourth embodiment.

FIG. 7 is a block diagram showing an imaging device according to a fourth embodiment.

As shown in FIG. 7, the imaging device differs from its counterpart of the first embodiment in that the function of a capturing unit 701 and that of a signal generation unit 703 are changed from those of their counterparts. In connection with other configurations and functions, FIG. 7 is identical with FIG. 1, which is a block diagram showing the configuration of the first embodiment, and hence the same reference numerals are assigned to corresponding elements in FIG. 7, and their explanations are omitted here.

The capturing unit 701 has a first capturing mode and a second capturing mode, and captures a picture, in time sequence, while effecting switching between the modes.

The signal generation unit 703 generates a first signal which is a signal for effecting switching between the capturing modes of the capturing unit 701 and a second signal used for specifying a core frame whose resolution is to be enhanced in the time-series images.

Figure 8:
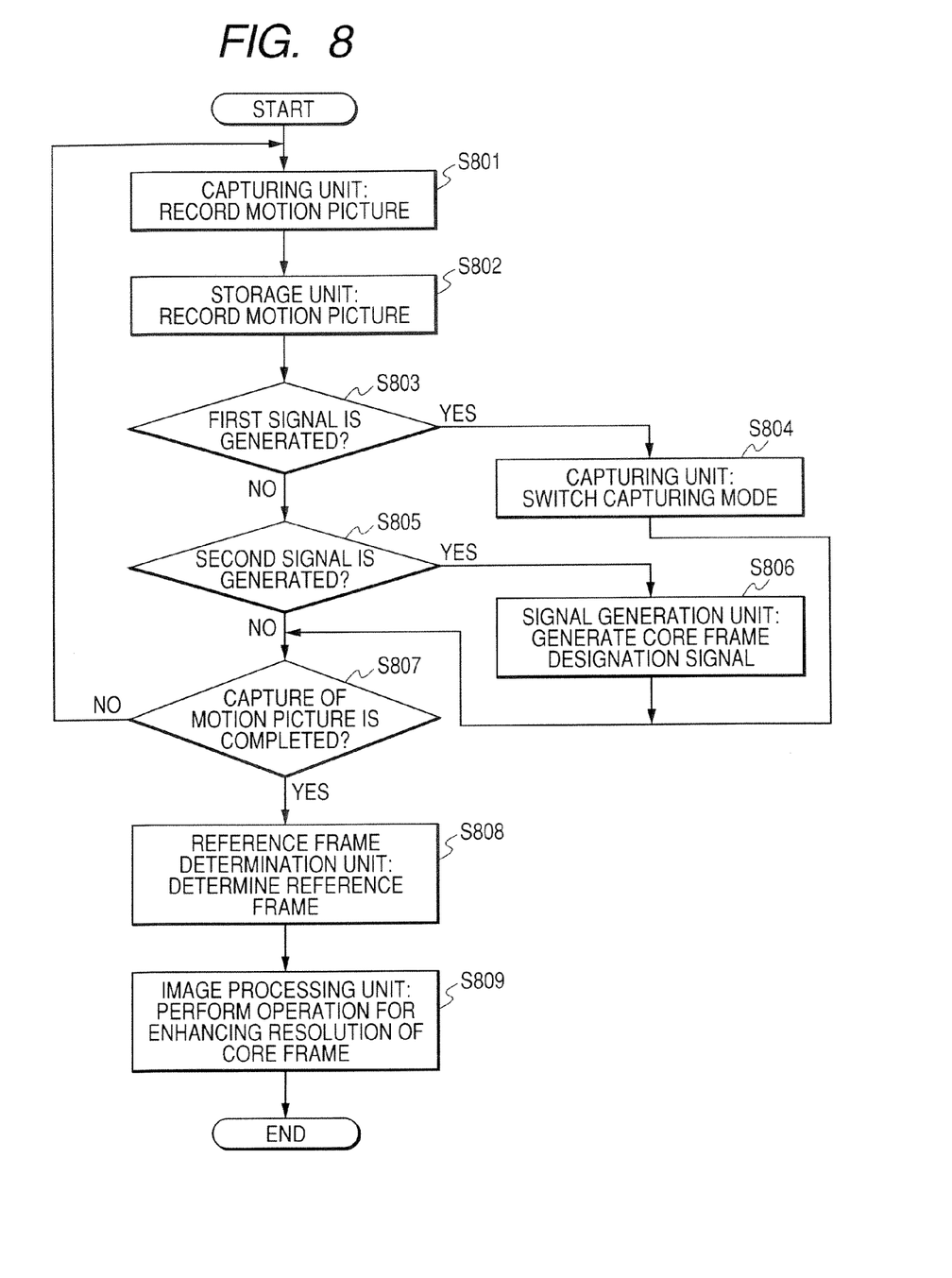
FIG. 8 is a flowchart showing operation of the imaging device according to the fourth embodiment.

Operation of the thus-configured imaging device induced by the first and second signals will now be described by reference to FIGS. 7 and 8. FIG. 8 is a flowchart showing operation of the imaging device according to the fourth embodiment.

The capturing unit 701 starts capturing time-series images in the first capturing mode (step S801). In the embodiment, it is assumed that the first capturing mode includes the following three modes.

Capturing mode A1, Capturing mode B1: Capturing modes for taking in time sequence a still image of VGA size (640× 480 pixels) into which the NTSC size of the existing television is digitized, at a frame rate of 30 fps; and is a mode generally used for capturing a motion picture.

Capturing mode C1: Capturing mode where time-series images are not taken.

Next, as in step S402, the storage unit 102 stores the captured time-series images (step S802).

Next, the signal generation unit 703 determines whether or not pressing of the shutter button 703*a* has been started (step S803). At the moment at which pressing of the shutter button 703*a* is started (Yes in step S803), the signal generation unit 703 generates a first signal used for switching the capturing mode of the capturing unit 701, and switches the capturing mode of the capturing unit 701 to the second capturing mode (step S804). Processing then proceeds to the next process (step S807). In the embodiment, it is assumed that the second capturing mode is a mode for taking a still image of VGA size (640×480 pixels) at the following frame rate.

Capturing mode A2: Captures image at a frame rate which is higher than a frame rate of 30 fps employed prior to capture of the still image Capturing mode B2: Captures image at spatial resolution which is higher than the VGA size (640×480 pixels) that is resolution for another frame.

Capturing mode C2: Captures time-series images.

When the present time is not the moment at which pressing of the shutter button 703*a* has been started (No in step S803); namely, when the user has not yet started pressing the shutter button 703*a* or has already started pressing the shutter button 703*a*, processing proceeds to the next process (step S805). A larger volume of information used for enhancing the resolution of a core frame can be observed even in connection with the frames acquired prior to the core frame to be specified later (for which the shutter button 703*a* is fully pressed), by means of switching the capturing mode between the capturing mode A2 that is the second capturing mode and the capturing mode B2, as well as by use of excessive processing capability of the imaging device obtained during capture of a motion picture. By means of switching the capturing mode to the capturing mode C2 that is the second capturing mode, capture of a still image can be started before the shutter button 703*a* is pressed to capture a still image when a still image (a core frame) is taken by a still camera.

Figure 14:
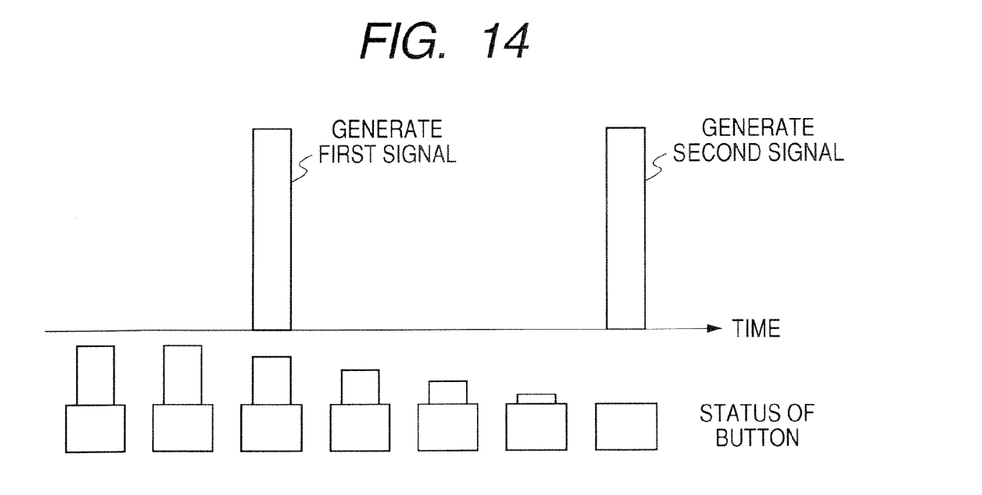
FIG. 14 is a view showing that the shutter button remains depressed, and a point in time when a first signal is generated and another point in time when a second signal is generated.

FIG. 14 shows that the shutter button 703*a* is pressed, as well as showing a point in time when a first signal is generated and another point in time when a second signal is generated.

As shown in FIG. 14, when force is exerted on the shutter button 703*a*, pressing of the shutter button 703*a* is started, and the shutter button 703*a* returns to its original position after the force has been eliminated. When pressing of the shutter button 703*a* is commenced, the first signal is generated. When the shutter button 703*a* has been fully pushed, the second signal is generated. The second signal becomes a signal used for designating the core frame. By means of generation of the first signal, storage of reference frames is commenced at a frame rate which is higher than that achieved earlier.

The signal generation unit 703 then determines whether or not the shutter button 703*a* has fully been pushed (step S805). When the shutter button 703*a* has been fully pushed (Yes in step S805), the signal generation unit 703 records a frame number assigned to a time-series image, which has been captured at the moment of the shutter button 703*a* having been fully pressed, as a signal used for specifying a core frame whose resolution is to be enhanced in the time-series image, to thus generate a signal used for again switching the capturing mode of the capturing unit 701 to the first capturing mode after lapse of a given period of time since capture of the core frame (step S806). Processing proceeds to the next process (step S807). When the shutter button 703*a* has not been fully pushed (No in step S805), processing proceeds to the next process (step S807).

Image capturing completion determination processing pertaining to step S807, reference frame determination processing pertaining to step S808, and core frame high-resolution operation processing pertaining to S809 are analogous to processing of the imaging device of the first embodiment in steps S406 to S408. Hence, their explanations are omitted.

Figure 11:
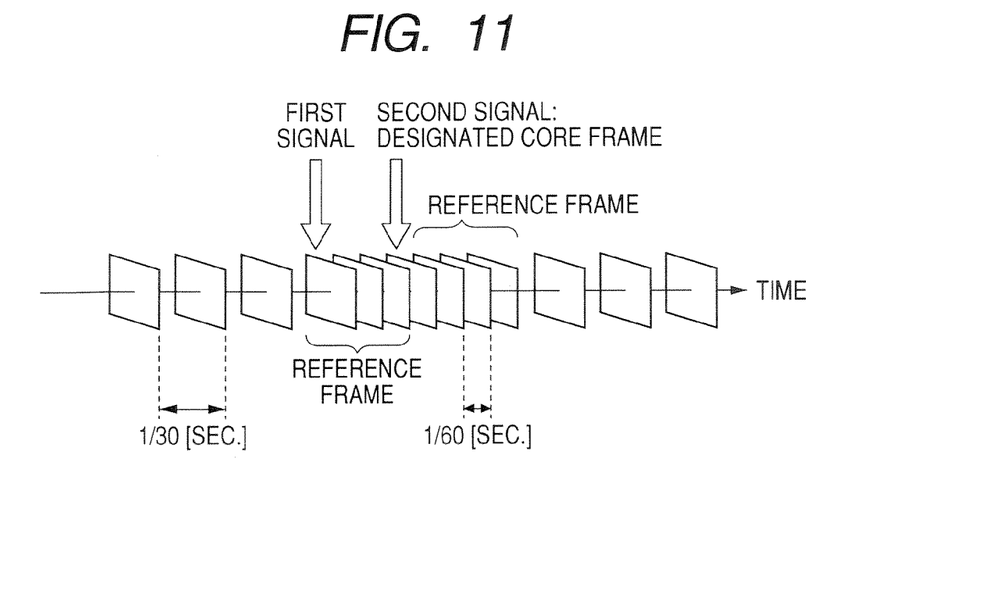
FIG. 11 is a view showing that a motion picture is taken for a given period of time before and after capture of a core frame at a frame rate which is higher than that employed in a time other than the predetermined time.

FIG. 11 shows an embodiment where the first frame rate is 1/30 second and the second frame rate is 1/60 second. In this embodiment, the core frame and reference frames straddling the core frame are captured at the second frame rate of 1/60 second. Thus, a motion picture is captured at a frame rate which is higher than that employed for a time other than the given period of time before and after the core frame. As a result, the scaling factor can be increased to a greater extent when the resolution of the core frame is enhanced further.

As mentioned above, according to the imaging device of the fourth embodiment, the signal generation unit generates a signal when pressing of the shutter button 703a is started and when the shutter button 703a is fully pressed. By means of acquiring information which has been available prior to the core frame and which is effective for enhancing resolution, the resolution of the core frame can be enhanced further.

Figure 12:
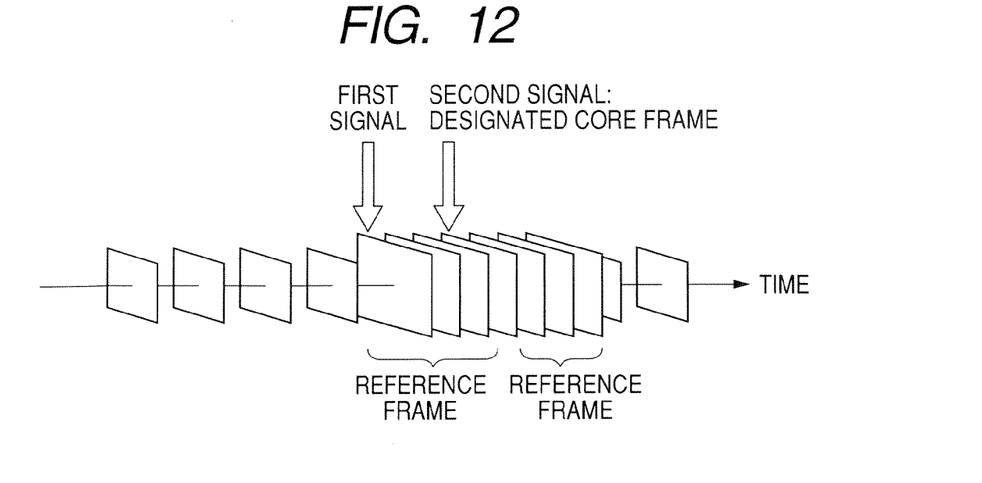
FIG. 12 is a view showing that a motion picture is taken for a given period of time before and after capture of a core frame at a frame rate and spatial resolution which are higher than those employed in a time other than the predetermined time.
Figure 13:
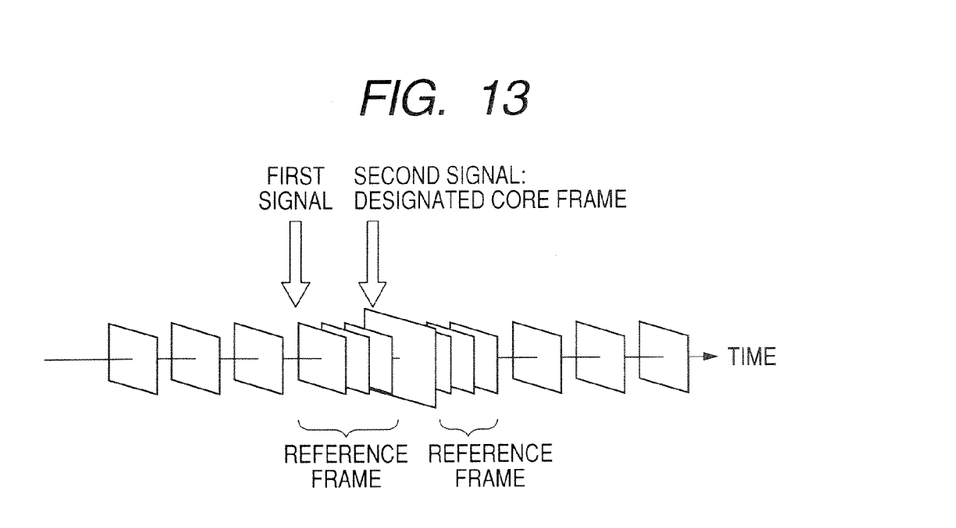
FIG. 13 is a view showing that a picture is taken for a given period of time before and after capture of a core frame at a frame rate and spatial resolution which are higher than those employed in a time other than the predetermined time, and that respective frames are captured with higher resolution.

In the fourth embodiment, as shown in FIG. 12, the core frame and the reference frames can be used for capturing a motion picture of higher spatial resolution, in addition to the above-mentioned image, at a frame rate which is higher than that acquired in the time other than the given period of time before and after the core frame. As shown in FIG. 13, for a given period of time before and after the frames, only the core frame can also be captured at a frame rate higher than that achieved in the time other than the given time and with higher spatial resolution.

As described above, according to the embodiments, there is recorded a frame number assigned to the motion picture captured at the moment of a shutter button being pressed to capture a still image while capturing motion picture. Subsequently, a core frame used for rendering the resolution of the frame designated by the frame number high and subsequent frames or frames straddling the core frame are recorded at a frame rate higher than that used during ordinary capturing operation. These frames are captured as reference frames used for high-resolution operation, and high-resolution operation is performed. As a result, a high-resolution still image of a desired moment can be taken without involvement of a substantial increase in the amount of processing to be performed during capture of a motion picture and an increase in circuitry scale.

What is claimed is:

1. An imaging device comprising:
a capturing unit that captures a motion picture at one of a plurality of frame rates;
a buffer that temporary stores the motion picture captured by the capturing unit;
a signal generation unit that generates a signal used for specifying a core frame that is to be subjected to a resolution enhancement processing, while the capturing unit captures the motion picture at a first frame rate;
a capturing control unit that controls the capturing unit to capture the motion picture, after the core frame specified by the signal, at a second frame rate that is higher than the first frame rate;
a reference frame determination unit that determines a frame stored in the buffer at the second frame rate as a reference frame; and
an image processing unit that performs the resolution enhancement processing by converting the core frame into a high-resolution frame by reference to the reference frame determined by the reference frame determination unit.

2. The imaging device according to claim 1, wherein the signal generation unit includes a shutter button,
wherein the capturing control unit controls the capturing unit to capture the motion picture at a third frame rate that is higher than the first frame rate when the shutter button is halfway pressed,
wherein the signal generation unit generates the signal when the shutter button is fully pressed, and
wherein the reference frame determination unit determines frames stored in the buffer at the second frame rate and at the third frame rate as the reference frame.

3. The imaging device according to claim 1, further comprising:
a hand shake detection unit that detects amounts of hand shakes; and
a hand shake amount storing unit that stores the amounts of hand shakes detected by the hand shake detection unit,
wherein the reference frame determination unit selects the reference frame by use of the stored amounts of hand shakes.

4. The imaging device according to claim 1, further comprising:
a hand shake detection unit that detects amounts of hand shakes; and
a hand shake amount storing unit that stores the amounts of hand shakes detected by the hand shake detection unit,
wherein the image processing unit converts the core frame into the high-resolution image by use of the stored amounts of hand shakes and the reference frame.

5. The imaging device according to claim 1, wherein the capturing control unit controls the image capturing unit to capture the core frame in a spatial resolution that is higher than that of other frames.

6. The imaging device according to claim 1, further comprising a motion detection unit that detects movements between the core frame and the reference frame,
wherein the image processing unit converts the core frame into the high-resolution frame by reference to the reference frame being applied with motion compensation on the basis of the movements detected by the motion detection unit.

7. The imaging device according to claim 1, wherein the reference frame determination unit determines frames stored in the buffer at the first frame rate and at the second frame rate as the reference frame.

8. The imaging device according to claim 1, wherein the image processing unit starts converting the core frame into the high-resolution frame after capturing the motion picture is terminated.

9. A method for capturing image, comprising:
capturing a motion picture at one of a plurality of frame rates;
temporary storing the captured motion picture;
generating a signal used for specifying a core frame that is to be subjected to a resolution enhancement processing, while capturing the motion picture at a first frame rate;
controlling the capturing of the motion picture by a capturing control unit to capture frames, after the core frame specified by the signal, at a second frame rate that is higher than the first frame rate;
determining a frame temporary stored at the second frame rate as a reference frame; and
performing the resolution enhancement processing by an image processing unit to convert into a high-resolution frame by reference to the reference frame.

10. The method according to claim 9, further comprising:
controlling the capturing to capture the motion picture at a third frame rate that is higher than the first frame rate when a shutter button is halfway pressed;
generating the signal when the shutter button is fully pressed; and
determining frames temporary stored at the second frame rate and at the third frame rate as the reference frame.

11. The method according to claim 9, further comprising:
detecting amounts of hand shakes;
storing the detected amounts of hand shakes; and
selecting the reference frame by use of the stored amounts of hand shakes.

12. The method according to claim 9, further comprising:
detecting amounts of hand shakes;
storing the detected amounts of hand shakes; and
converting the core frame into the high-resolution image by use of the stored amounts of hand shakes and the reference frame.

13. The method according to claim 9, further comprising controlling the capturing to capture the core frame in a spatial resolution that is higher than that of other frames.

14. The method according to claim 9, further comprising:
detecting movements between the core frame and the reference frame; and
converting the core frame into the high-resolution frame by reference to the reference frame being applied with motion compensation on the basis of the detected movements.

15. The method according to claim 9, further comprising determining frames temporary stored at the first frame rate and at the second frame rate as the reference frame.

16. The method according to claim 9, wherein the process of converting the core frame into the high-resolution frame is started after capturing the motion picture is terminated.

* * * * *